(12) United States Patent
Pei et al.

(10) Patent No.: US 11,669,978 B2
(45) Date of Patent: Jun. 6, 2023

(54) METHOD AND DEVICE FOR ESTIMATING BACKGROUND MOTION OF INFRARED IMAGE SEQUENCES AND STORAGE MEDIUM

(71) Applicant: Shenzhen University, Guangdong (CN)

(72) Inventors: Jihong Pei, Guangdong (CN); Kaiwen Liao, Guangdong (CN); Weixin Xie, Guangdong (CN); Xuan Yang, Guangdong (CN)

(73) Assignee: SHENZHEN UNIVERSITY, Guangdong (CN)

( * ) Notice: Subject to any disclaimer, the term of this patent is extended or adjusted under 35 U.S.C. 154(b) by 221 days.

(21) Appl. No.: 17/278,972

(22) PCT Filed: Sep. 7, 2020

(86) PCT No.: PCT/CN2020/113690
§ 371 (c)(1),
(2) Date: Mar. 23, 2021

(87) PCT Pub. No.: WO2021/057455
PCT Pub. Date: Apr. 1, 2021

(65) Prior Publication Data
US 2021/0358133 A1 Nov. 18, 2021

(30) Foreign Application Priority Data
Sep. 25, 2019 (CN) .......................... 201910910191.8

(51) Int. Cl.
*G06T 7/223* (2017.01)
*G06T 7/246* (2017.01)

(52) U.S. Cl.
CPC .............. *G06T 7/223* (2017.01); *G06T 7/248* (2017.01); *G06T 2207/10016* (2013.01); *G06T 2207/10048* (2013.01); *G06T 2207/20021* (2013.01)

(58) Field of Classification Search
None
See application file for complete search history.

(56) References Cited

U.S. PATENT DOCUMENTS

| 2004/0114799 A1* | 6/2004 | Xu ......................... G06V 20/40 382/173 |
| 2005/0265453 A1* | 12/2005 | Saito ....................... G06T 7/215 375/240.24 |
| 2018/0137641 A1* | 5/2018 | Chen ......................... G06T 7/11 |

* cited by examiner

*Primary Examiner* — Vikkram Bali
(74) *Attorney, Agent, or Firm* — Dinsmore & Shohl LLP

(57) ABSTRACT

The present application provides a method and a device for estimating background motion of infrared image sequences and a storage medium. The method comprises: determining regions to be matched according to the maximum displacement of two adjacent frames of images in background motion, dividing the region to be matched into T sub-regions, and generating M groups of sub-window sets in the sub-regions randomly, and computing the background motion displacement corresponding to these sub-window sets by synchronous mutual information matching, then calculating the background motion displacement between two adjacent frames of images by a potential function voting method according to the background motion displacement corresponding to these sub-window sets. The method in the present application is based on image block matching, and does not depend on feature point extraction, so it has high robustness for background motion estimation of infrared image sequences with few feature points and noise interference.

8 Claims, 3 Drawing Sheets

METHOD AND DEVICE FOR ESTIMATING BACKGROUND MOTION OF INFRARED IMAGE SEQUENCES AND STORAGE MEDIUM

CROSS REFERENCE TO RELATED APPLICATIONS

This application is the U.S. National stage of PCT/CN2020/113690 filed Sep. 7, 2020, which claims priority of Chinese patent application 201910910191.8 filed Sep. 25, 2019, both of which are hereby incorporated by reference in their entirety.

TECHNICAL FIELD

The present application belongs to the technical field of image processing, and particularly relates to a method and a device for estimating background motion of infrared image sequences and storage medium.

BACKGROUND

Infrared target detection technology has a very important application in infrared early warning, automatic navigation and other technical fields, especially in small dim target detection of infrared images. Because of the long imaging distance and low imaging resolution of the infrared imaging system, targets are often presented as bright spots of several to over a dozen pixels, without obvious texture features, accompanied by a lot of noise interference, which brings great difficulties to infrared dim target detection. Therefore, when the background is relatively static, a background subtraction method is often used to detect the target. However, when the camera tracks the target and causes the background to move, it is necessary to estimate the background motion so as to compensate the corresponding motion and keep the background relatively static. Therefore, in the detection of infrared small dim targets with complex background, background motion estimation is an important link, which has great influence on the accuracy of target detection.

In infrared remote scenes, when the background moves due to the motion or jitter of the target tracked by the infrared camera lens, the motion between the backgrounds of two adjacent frames of images can be approximately regarded as translation transformation. In this case, the current background motion estimation is mainly divided into three categories: motion estimation method based on image block matching, motion estimation method based on feature point matching and optical flow method.

The background motion estimation method based on image block matching is to select a sub-image as a matching template at a fixed position of the current frame of image, then put the window where these templates are located in a next frame of image of the image sequence for sliding and search, and calculate the similarity relationship between the template and the sub-image covered by the corresponding template window through a similarity measurement function, find a best matching position of the template image in the next frame of image, and then calculate the displacement of background motion. Usually, this method can achieve desirable background motion estimation results. However, when the matching template image is used to select a region with uniform grey scale distribution in the image, the estimation of background motion will be greatly reduced because the image blocks in this region have high similarity with the template image. In this regard, some people estimate the motion by selecting one image template at a time, then estimating it N times with templates in different regions, and using some statistical average of N times as the final background motion estimation result, but because of the unpredictability of the background, when most of the N template image blocks selected by this method are in the grey scale flat area, the estimation result will be inaccurate. In addition, when there is a moving target in the image, due to the unpredictability of the target motion, if the selected template sub-image contains a target area, the matching position of the template image in the next frame of image will be affected by the target motion, which will reduce the accuracy of background motion estimation.

To sum up, for the background motion estimation problem of infrared image sequences with low image resolution, many grey scale flat areas and great influence by noise interference, among the existing methods, the background motion estimation method based on block matching will lead to inaccurate background motion estimation results when the template image is selected in the grey scale flat area or contains a moving object.

SUMMARY

The present application provides a method for estimating background motion of infrared image sequences, which is used for solving the technical problem that the background motion estimation method based on image block matching in the prior art causes inaccurate background estimation results when the template image is in a grey scale flat area and the template image block contains a moving target area.

A first aspect of the present application provides a method for estimating background motion of infrared image sequences, comprising:

acquiring motion characteristics of a camera in a scene where the camera is located;

estimating a possible maximum displacement of a field of view of the camera in two adjacent frames of images of the infrared image sequences shot by the camera according to the motion characteristics;

determining regions to be matched of the two adjacent frames of images by using the maximum displacement, wherein the regions to be matched are the regions with the same background in the two adjacent frames of images;

dividing the regions to be matched into T sub-regions with the same shape and size, and randomly generating M groups of sub-window set with the same shape in the T sub-regions of the region to be matched, wherein each group of sub-window set comprises K sub-windows, where T, K and M are positive integers, and K is greater than T; and each sub-window is entirely located in a sub-region, and each sub-region comprises at least one sub-window;

computing M background motion displacements of the two adjacent frames of images according to the M groups of sub-window set, through randomly sampling multi-window synchronous mutual information matching; and determining the background motion displacement between the two adjacent frames of images in the image sequences by a potential function voting method according to the M background motion displacements.

Preferably, the sub-region is strip or rectangle-shaped, and the sub-window is strip or rectangle-shaped.

Preferably, randomly generating M groups of sub-window set in the T sub-regions of the region to be matched comprises:

acquiring parameters of each sub-region which comprise point coordinates of an upper left corner of the sub-region and height and width values of the sub-region, wherein the point coordinates of the upper left corner of the sub-region are determined based on a two-dimensional rectangular coordinate system established by taking an upper left corner of the region to be matched as an origin, an x-axis extending downward and a y-axis extending rightward;

acquiring the height and width values of the sub-windows in each sub-window set;

calculating the coordinates of the upper left corner of each sub-window using a random generation formula, according to the height and width value of each sub-window and parameters of a sub-region where the sub-window is located; and obtaining the M groups of sub-window set according to the coordinates of the upper left corner of each sub-window and the height and width values of the sub-windows.

Preferably, the random generation formula is expressed as:

$$x_{mk} = \text{Round}(x_t + \text{Uniform}(0,1)*(H_x - h_x))$$

$$y_{mk} = \text{Round}(y_t + \text{Uniform}(0,1)*(H_y - h_y))$$

wherein $x_{mk}$ is a coordinate of a $k^{th}$ sub-window in an $m^{th}$ group of sub-window set on the x-axis, and $y_{mk}$ is a coordinate of the $k^{th}$ sub-window in the $m^{th}$ group of sub-window set on the y-axis, Uniform(0,1) is a function to uniformly distribute a random number in a random generation interval [0,1], Round (.) is a rounding function, $x_t$ is a coordinate of an upper left corner of a $t^{th}$ sub-region on the x-axis, $y_t$ is a coordinate of the upper left corner of the $t^{th}$ sub-region on the y-axis, $H_x$ is a height value of the sub-region, $H_y$ is a width value of the sub-region, $h_x$ is a height value of the sub-window, and $h_y$ is a width value of the sub-window.

Preferably, computing M possible background motion displacements of the two adjacent frames of images according to the M groups of sub-window set, through randomly sampling multi-window synchronous mutual information matching comprise the following steps:

S1: acquiring rectangular neighborhoods of displacements of the two adjacent frames of images on the x-axis and y-axis of the established two-dimensional rectangular coordinate system;

S2: extracting image blocks covered on a former frame of image of the two adjacent frames of images for all sub-windows in a specified sub-window set, and connecting the image blocks according to a preset order to generate a first image;

S3: randomly taking a displacement in the rectangular neighborhoods of the displacements, and moving the specified sub-window set by the displacement to obtain a moved sub-window set;

S4: extracting image blocks covered on a latter frame of image of the two adjacent frames of images for all sub-windows in the moved sub-window set, and connecting the extracted image blocks according to the preset order to generate a second image;

S5: calculating mutual information of the first image and the second image; S6: calculating mutual information corresponding to all displacements of the specified sub-window set in the rectangular neighborhoods of displacements according to steps S2 to S5, and taking the displacement corresponding to the maximum mutual information as the background motion displacement corresponding to the specified sub-window set; and S7: calculating the background motion displacement corresponding to all the sub-window set according to steps S2 to S6, and obtaining the M background motion displacements of the two adjacent frames of images.

Preferably, the formula for calculating the mutual information of the first image and the second image is:

$$MI(A_m, B_m(dx,dy)) = H(A_m) + H(B_m(dx,dy)) - H(A_m, B_m(dx,dy))$$

wherein $A_m$ is the first image, and $B_m(dx,dy)$ is the second image obtained after the first image $A_m$ is moved by the displacement (dx,dy), $MI(A_m, B_m(dx,dy))$ is the mutual information of the first image and the second image, H(.) is an image entropy function, and H(.,.) is an image joint entropy function.

Preferably, determining the background motion displacement between the two adjacent frames of images in the image sequence by using a potential function voting method according to the M background motion displacements comprises:

selecting a radial basis function as a kernel function, and calculating the potential function value of each displacement in the M background motion displacements of the two adjacent frames of images, wherein the displacement corresponding to the maximum potential function value among the potential function values of each displacement is the background motion displacement between two adjacent frames of images Preferably, the potential function value is calculated by the following formula:

$$P(dx_m, dy_m) = \sum_{i=1}^{M} e^{-\frac{(dx_m - dx_i)^2 + (dy_m - dy_i)^2}{2\sigma^2}}, m = 1, 2, \ldots, M;$$

wherein $(dx_m, dy_m)$ is the background motion displacement corresponding to the $m^{th}$ sub-window set, among a total of M sub-window set, m=1, 2, ..., M; $P(dx_m, dy_m)$ is the potential function value of the displacement corresponding to the $m^{th}$ sub-window set; $dx_i$ is a displacement of the displacement corresponding to an $i^{th}$ sub-window set on the x-axis; $dy_i$ is a displacement of the displacement corresponding to the $i^{th}$ sub-window set on the y-axis; and $\sigma$ is a kernel width parameter of the kernel function, $\sigma=1$.

A second aspect of the present application provides a device for estimating background motion for infrared image sequences, comprising:

a motion characteristic acquisition module, configured to acquire motion characteristics of a camera in a scene where the camera is located;

a maximum displacement estimation module, configured to estimating a possible maximum displacement of a field of view of the camera in two adjacent frames of images of the infrared image sequences shot by the camera according to the motion characteristics;

a to-be-matched region determining module, configured to determine regions to be matched of the two adjacent frames of images by using the maximum displacement, wherein the regions to be matched are the regions with the same background in the two adjacent frames of images;

a sub-window set generating module, configured to divide the regions to be matched into T sub-regions, and randomly generating M groups of sub-window set with the same shape in the T sub-regions of the region to be matched, wherein each group of sub-window set comprises K sub-windows, where T, K and M are positive integers, and K is greater than T; and each sub-window is entirely located in a sub-region, and each sub-region comprises at least one sub-window;

a sub-window set displacement calculation module, configured to compute M possible background motion displacements of the two adjacent frames of images according to the M groups of sub-window set, through randomly sampling multi-window synchronous mutual information matching; and a background motion displacement calculation module, configured to determine the background motion displacement between the two adjacent frames of images in the image sequences by a potential function voting method according to the M background motion displacements.

A third aspect of the present application also provides a readable storage medium, storing a computer program thereon, which is characterized in that, when the computer program is executed, each step described in the first aspect is executed.

As can be seen from the above embodiments of the present application, in order to solve the motion estimation problem of background moving in an image during infrared imaging caused by rotation or jittering of infrared camera in infrared remote imaging scenes, the present application provides a method for estimating background motion of infrared image sequences. In this method, the region to be matched is determined according to the maximum displacement of two adjacent frames of images in background motion, and the region to be matched is divided into a certain number of sub-regions. In these sub-regions, a certain number of sub-window sets are generated by a random method, and background motion displacement corresponding to these sub-window sets is calculated by a synchronous mutual information matching method, and then the background motion displacement between two adjacent frames of images is calculated by a potential function voting method based on the background motion displacement corresponding to the sub-window sets. The method is based on image block matching and does not depend on feature point extraction, so it has high robustness for background motion estimation of infrared image sequences with few feature points and noise interference, and can effectively solve the problem that the template images selected in the block matching algorithm cause unreliable matching results of background estimation results in a flat area, and the problem that the background motion estimation results are interfered by moving targets when the template image blocks contain moving target areas.

BRIEF DESCRIPTION OF THE DRAWINGS

In order to explain the technical solution of the embodiments of the present application or the prior art more clearly, the drawings required in the embodiments or the description of the prior art will be briefly introduced below. Obviously, the drawings in the following description are only some embodiments of the present application, and for those skilled in the art, other drawings can be obtained according to these drawings without making creative efforts.

DETAILED DESCRIPTION

In order to make the purpose, features and advantages of the present application more obvious and easy to understand, the technical solutions in the embodiments of the present application will be described clearly and completely with reference to the drawings in the embodiments of the present application. Obviously, the described embodiments are only part of rather than all embodiments of the present application. Based on the embodiments in the present application, all other embodiments obtained by those skilled in the art without creative efforts belong to the protection scope of the present application.

Figure 1:
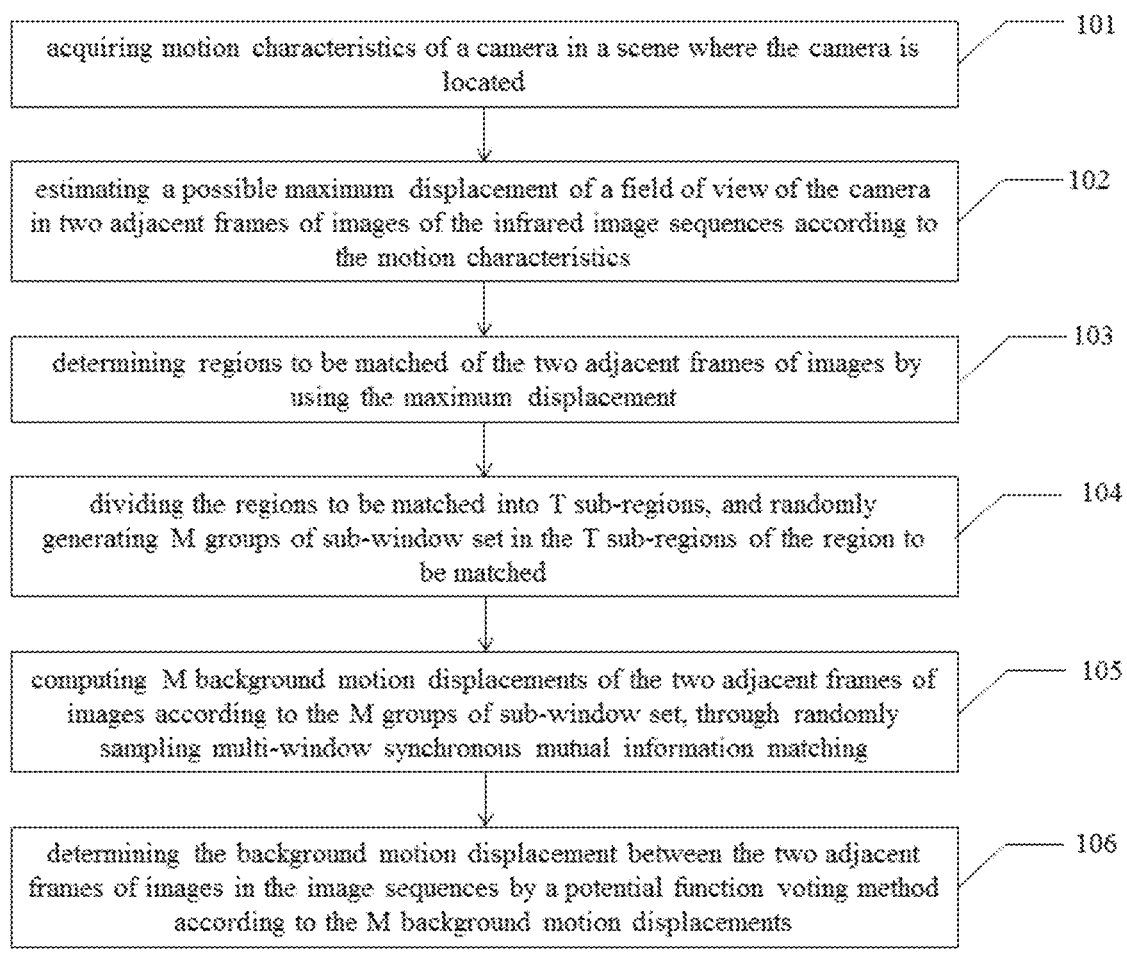
FIG. 1 is a schematic flow diagram of a method for estimating background motion of infrared image sequences provided by an embodiment of the present application.

The first aspect of an embodiment of the present application provides a method for estimating background motion of infrared image sequences, as shown in FIG. 1, which is a schematic flow diagram of a method for estimating background motion of infrared image sequences provided by an embodiment of the present application, comprising:

Step 101, acquiring motion characteristics of a camera in a scene where the camera is located;

In the embodiment of the present application, in infrared remote imaging scenes, the rotation or jittering of the infrared camera causes the background image to move during imaging, thus, it is necessary to make a reliable estimation of the displacement of the imaging background image in this scene. According to the estimation method provided by the embodiment of the present application, firstly, the motion characteristics of the scene where the camera is located during actual shooting are acquired. Here, the motion characteristics refer to various possible situations in which the camera is displaced in the scene in a unit time. Or to be understood from another aspect, the motion characteristics include the possible motion direction and speed of the camera in the scene.

Step 102, estimating a possible maximum displacement of a field of view of the camera in two adjacent frames of images of the infrared image sequences shot by the camera according to the motion characteristics.

In this embodiment of the present application, according to the motion characteristics of the camera in an environment where the camera is located that is acquired in step 101, the possible maximum displacement of the field of view of the camera in two adjacent frames of images of the infrared image sequence shot by the camera is estimated. It is assumed that two frames of images are $F_0$ and $F_1$ respectively, where $F_0$ is the previous frame of image and $F_1$ is the latter frame of image.

Figure 3:
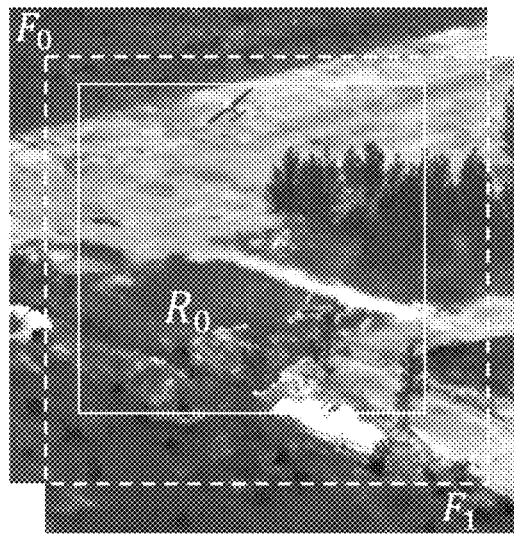
FIG. 3 is a schematic diagram of an region to be matched between two adjacent frames of images provided by an embodiment of the present application.

Step 103, determining regions to be matched of the two adjacent frames of images by using the maximum displacement, wherein the regions to be matched are the regions with the same background in the two adjacent frames of images;

In the embodiment of the present application, the regions to be matched $R_0$ of the two frames of images $F_0$ and $F_1$ are determined according to the maximum displacement estimated in step 102. As shown in FIG. 3, which is a schematic diagram of the region to be matched of the two adjacent frames of images provided in the embodiment of the present application, where $F_0$ is the previous frame of image and $F_1$ is the latter frame of image, and $R_0$ is an region to be matched determined according to the maximum displacement of two adjacent frames of images, $F_0$ and $F_1$.

Step 104, dividing the regions to be matched into T sub-regions with the same shape and size, and randomly generating M groups of sub-window set with the same shape in the T sub-regions of the region to be matched, wherein each group of sub-window set comprises K sub-windows, where T, K and M are positive integers, and K is greater than T; and each sub-window is entirely located in a sub-region, and each sub-region comprises at least one sub-window.

Figure 4:
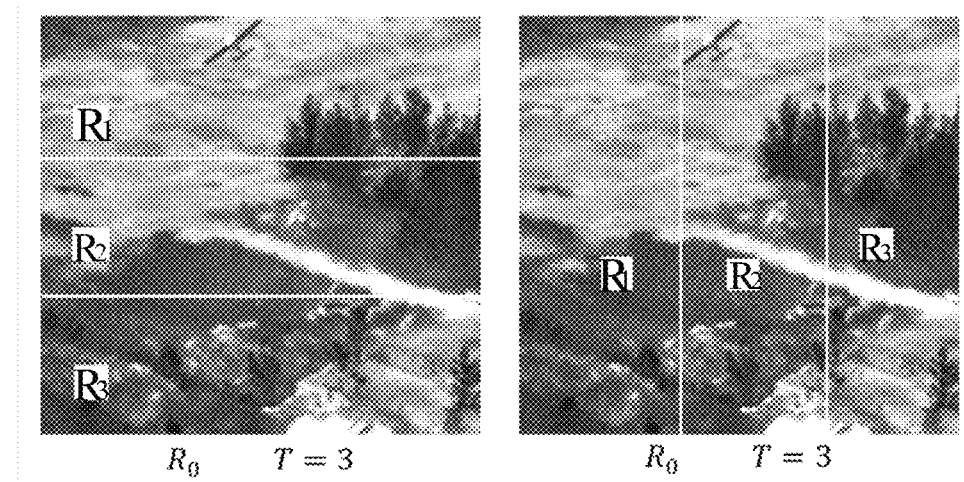
FIG. 4 is a diagram showing examples of several divisions where the region to be matched is divided into T sub-regions provided by an embodiment of the present application.

In this embodiment of the present application, the region $R_0$ to be matched determined in step 103 is divided into T sub-regions uniformly with the same shape and size, referring to FIG. 4, which shows several examples of divisions where the region to be matched is divided into T sub-regions provided in an embodiment of the present application. According to the examples in FIG. 4, the region to be matched is evenly divided into three sub-regions $R_1$, $R_2$ and $R_3$. M groups of sub-window set are generated in the T sub-regions randomly. Each sub-window set comprises K sub-windows with the same shape, each sub-window is entirely located in a sub-region, and each sub-region comprises at least one sub-window, where T, K and M are positive integers, and K is greater than T.

Step 105, computing M background motion displacements of the two adjacent frames of images according to the M groups of sub-window set, through randomly sampling multi-window synchronous mutual information matching.

In the embodiment of the present application, background motion displacements corresponding to each sub-window set are computed, through randomly sampling multi-window synchronous mutual information matching, according to the randomly generated M groups of sub-window set, to obtain the M background motion displacements.

Step 106, determining the background motion displacement between the two adjacent frames of images in the image sequences by a potential function voting method according to the M background motion displacements.

In this embodiment of the present application, according to the obtained M background motion displacements, the potential function value corresponding to each displacement is solved by the potential function voting method, and the background motion displacement between two adjacent frames of images in the image sequence is determined according to the magnitude of the potential function value.

In the present application, the region to be matched is determined according to the maximum displacement of two adjacent frames of images in background motion, and the region to be matched is divided into a certain number of sub-regions, in which a certain number of sub-window sets are generated by a random method, and the background motion displacement corresponding to these sub-window sets is calculated by the synchronous mutual information matching method. Then, according to the background motion displacement corresponding to these sub-window sets, the background motion displacement between two adjacent frames of images is calculated by using the potential function voting method. The method of the present application is based on image block matching and does not depend on the extraction of feature points, so for the case with fewer feature points, and where the background motion estimation of infrared image sequences disturbed by noise has high robustness, the method can effectively overcome the problem of unreliable matching results of background estimation results for template images selected in flat areas in the block matching algorithm, and the problem that the estimation results of background motion are interfered by moving targets when the template image blocks contain moving target regions.

Preferably, the T sub-regions referred to in FIG. 1 are strip-shaped or rectangle.

In the embodiment of the present application, the T sub-regions are strip-shaped or rectangular, with the same width and height. The sub-windows in the randomly generated sub-window sets are also strip-shaped or rectangular, and these sub-windows also have the same width and height.

Furthermore, randomly generating M groups of sub-window set in the T sub-regions of the region to be matched comprises:

acquiring parameters of each sub-region which comprise point coordinates of an upper left corner of the sub-region and height and width values of the sub-region, wherein the point coordinates of the upper left corner of the sub-region are determined based on a two-dimensional rectangular coordinate system established by taking an upper left corner of the region to be matched as an origin, an x-axis extending downward and a y-axis extending rightward;

acquiring the height and width values of the sub-windows in each sub-window set;

acquiring the number of sub-windows in each sub-region and determining the sub-region where each sub-window is located;

calculating the coordinates of the upper left corner of each sub-window using a random generation formula, according to the height and width value of each sub-window and parameters of a sub-region where the sub-window is located; and obtaining the M groups of sub-window set according to the coordinates of the upper left corner of each sub-window and the height and width values of the sub-windows.

Figure 5:
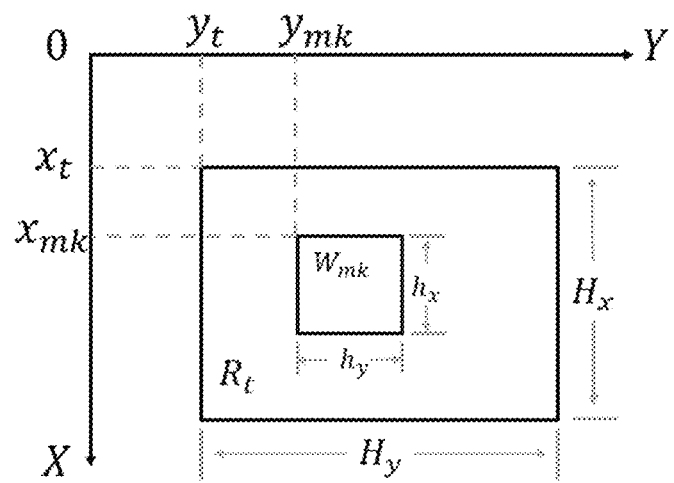
FIG. 5 is a schematic diagram of a two-dimensional rectangular coordinate system provided by an embodiment of the present application.

In an embodiment of the present application, a two-dimensional rectangular coordinate system is established by taking an upper left corner of the region to be matched as an origin, an x-axis extending downward and a y-axis extending rightward. As shown in FIG. 5, which is a schematic diagram of a two-dimensional rectangular coordinate system provided by an embodiment of the present application, $R_t$ is an arbitrary sub-region, $W_{mk}$ is an arbitrary sub-window, $(x_t, y_t)$ are the coordinates of the upper left corner of the sub-region $R_t$, and $(H_x, H_y)$ are the height and width of the sub-region $R_t$. $(x_{mk}, y_{mk})$ are the coordinates of the upper left corner of the sub-window $W_{mk}$, $(h_x, h_y)$ are the height and width of the sub-window $W_{mk}$. The region $R_0$ to be matched is divided into T sub-regions $R_1, R_2, \ldots R_t, \ldots R_T$, with a height $H_x$ and a width $H_y$ respectively, and with the same size, and each sub-region is determined by four parameters:

$$R_t:(x_t,y_t,H_x,H_y), t=1,2,\ldots,T, k=1,2,\ldots,K$$

wherein, $(x_t, y_t)$ are the coordinates of the upper left corner of the sub-region $R_t$, and $(H_x, H_y)$ are the height and width of the sub-region $R_t$.

An arbitrary set $W_m$ among the randomly generated M groups of sub-window sets $W_1, W_2, \ldots W_m, \ldots W_M$ consists of K sub-windows of equal size, whose height and width are $h_x$ and $h_y$, respectively:

$$W_m = \{W_{m1}, W_{m2}, \ldots W_{mk}, \ldots, W_{mK}\}, m=1,2,\ldots,M$$

Each sub-window is determined by four parameters:

$$W_{mk}:(x_{mk},y_{mk},h_x,h_y), m=1,2,\ldots,M, k=1,2,\ldots,K.$$

Where $(x_{mk}, y_{mk})$ are the coordinates of the upper left corner of the sub-window $W_{mk}$, $(h_x,h_y)$ are the height and width of the sub-window $W_{mk}$, and $$h_x < H_x, h_y < H_y$$

Therefore, by determining the parameters of sub-regions, the number of sub-window sets, the height and width values of sub-windows, the number of sub-windows in each sub-region, and the sub-region where each sub-window is located, the coordinates of the upper left corner of each sub-window can be calculated by a random generation formula, thus obtaining the parameters of all sub-windows in the M groups of sub-window sets, i.e., obtaining the M groups of sub-window sets.

Further, the random generation formula is expressed as:

$$x_{mk} = \text{Round}(x_t + \text{Uniform}(0,1)*(H_x - h_x))$$

$$y_{mk} = \text{Round}(y_t + \text{Uniform}(0,1)*(H_y - h_y))$$

wherein $x_{mk}$ is a coordinate of a $k^{th}$ sub-window in an $m^{th}$ group of sub-window set on the x-axis, and $y_{mk}$ is a coordinate of the $k^{th}$ sub-window in the $m^{th}$ group of sub-window set on the y-axis, Uniform(0,1) is a function to uniformly distribute a random number in a random generation interval [0,1], Round (.) is a rounding function, $x_t$ is a coordinate of an upper left corner of a $t^{th}$ sub-region on the x-axis, $y_t$ is a coordinate of the upper left corner of the $t^{th}$ sub-region on the y-axis, $H_x$ is a height value of the sub-region, $H_y$ is a width value of the sub-region, $H_x$ is a height value of the sub-window, and $h_y$ is a width value of the sub-window.

Figure 2:
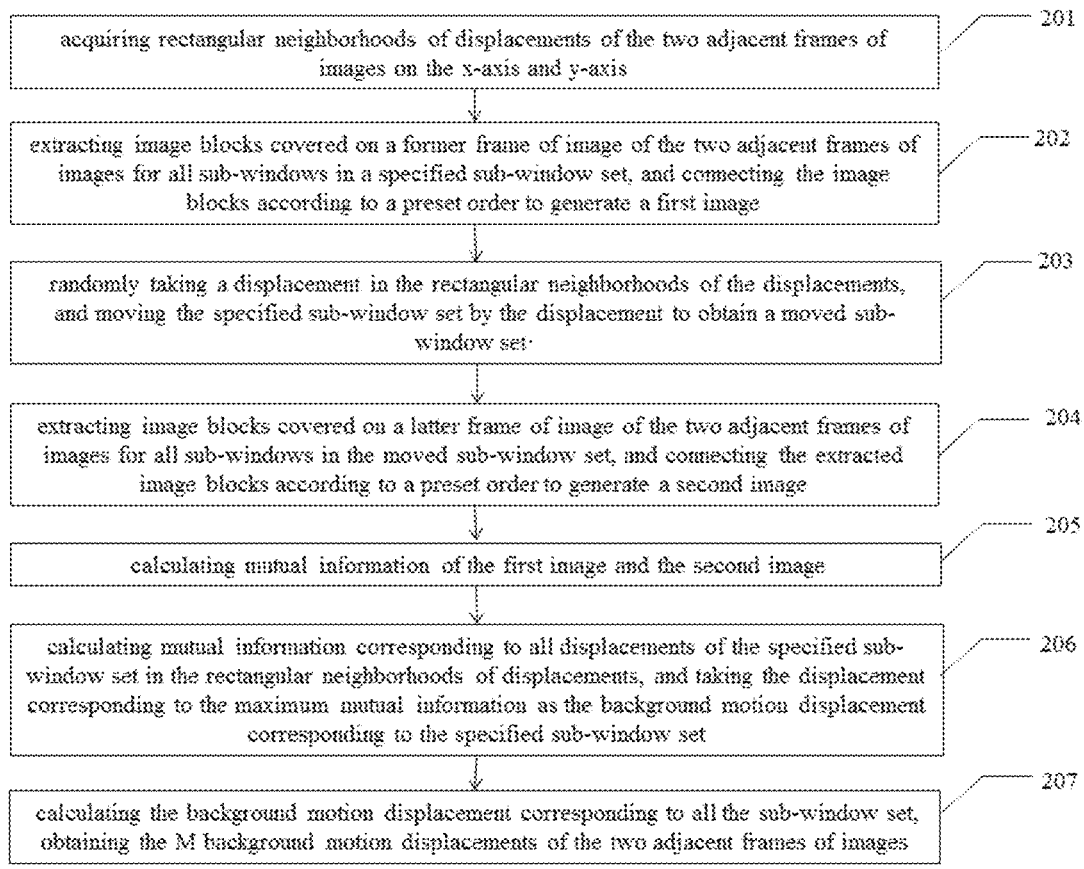
FIG. 2 is a flow chart of calculating M possible background motion displacements of two adjacent frames of images by random sampling multi-window synchronous mutual information matching provided by an embodiment of the present application.

Further, M possible background motion displacements of the two adjacent frames of images are computed through randomly sampling multi-window synchronous mutual information matching, as shown in FIG. 2, which is a flow diagram for calculating the M possible background motion displacements of two adjacent frames of images by using the random sampling multi-window synchronous mutual information matching method provided by the embodiment of the present application, including the following steps:

Step 201, acquiring rectangular neighborhoods of displacements of the two adjacent frames of images on the x-axis and y-axis.

In the embodiment of the present application, (dx, dy) is the displacement of the image background motion, and rectangular neighborhoods of the displacements are obtained as: $-D_x \leq d_x \leq D_x$, $-D_y \leq d_y \leq D_y$, wherein $D_x$ and $D_y$ are two integer constants representing the size of the neighborhood.

Step 202, extracting image blocks covered on a former frame of image of the two adjacent frames of images for all sub-windows in a specified sub-window set, and connecting the image blocks according to a preset order to generate a first image.

In the embodiment of the present application, the sub-window set $W_m = \{W_{m1}, \ldots W_{mk}, \ldots, W_{mK}\}$ is selected, and in the previous frame of image $F_0$, the K sub-image blocks extracted by $W_m$ are: $A_{m1}, \ldots A_{mk}, \ldots, A_{mK}$, respectively, where $A_{mk}$ is an image block of the sub-window $W_{mk}$ covered in the image $F_0$, and the covered image block are connected in a certain order to generate an image $A_m = A_{m1} \ldots A_{mk} \ldots A_{mK}$.

Step 203, randomly taking a displacement in the rectangular neighborhoods of the displacements, and moving the specified sub-window set by the displacement to obtain a moved sub-window set.

In this embodiment of the present application, an arbitrary displacement $(d_x, d_y)$ is taken in the rectangular neighborhood in step 201, and each sub-window in the sub-window set $W_m$, which is selected in step 202, is synchronously moved according to the displacement, wherein $W_m(dx, dy)$ is the sub-window set after $W_m$ moves:

$$W_m(dx,dy): \{W_{m1}(dx,dy), \ldots W_{mk}(dx,dy), W_{mK}(dx,dy)\}$$

then the parameters of $W_{mk}(dx, dy)$ are expressed as $(x_{mk}+dx, y_{mk}+dy, h_x, h_y)$ Step 204, extracting image blocks covered on a latter frame of image of the two adjacent frames of images for all sub-windows in the moved sub-window set, and connecting the extracted image blocks according to a particular order to generate a second image.

In the embodiment of the present application, image blocks of each sub-window in the moved sub-window set $W_m(dx, dy)$ that is covered in the latter frame of image $F_1$ are extracted, and the extracted image blocks are expressed as $B_{m1}(dx, dy), \ldots B_{mk}(dx, dy), \ldots, B_{mK}(dx, dy)$, wherein $B_{mk}(dx, dy)$ is the image block of the sub-window $W_{mk}(dx, dy)$ that is covered in the image $F_1$. These extracted image blocks are connected in the same order as in step 202 to generate an images $B_m(dx, dy) = B_{m1}(dx, dy) \ldots B_{mk}(dx, dy) \ldots B_{mK}(dx, dy)$.

Step 205, calculating mutual information of the first image and the second image;

In an embodiment of the present application, the mutual information $MI(A_m, B_m(dx, dy))$ of the images $A_m$ and $B_m(dx, dy)$ is calculated by:

$$MI(A_m, B_m(dx,dy)) = H(A_m) + H(B_m(dx,dy)) - H(A_m, B_m(dx,dy))$$

wherein $A_m$ is the first image, and $B_m(dx,dy)$ is the second image obtained after the first image $A_m$ is moved by the displacement (dx, dy), $MI(A_m, B_m(dx,dy))$ is the mutual information of the first image and the second image, H(.) is an image entropy function, and H(.,.) is an image joint entropy function.

Step 206, calculating mutual information corresponding to all displacements of the specified sub-window set in the rectangular neighborhoods of displacements, and taking the displacement corresponding to the maximum mutual information as the background motion displacement corresponding to the specified sub-window set.

In this embodiment of the present application, mutual information of the two extracted images corresponding to all displacements of the specified sub-window set in the rectangular neighborhoods of displacements according to the method detailed in step 201 to step 205, and taking the displacement corresponding to the maximum mutual information as the background motion displacement corresponding to the sub-window set.

Step 207, calculating the background motion displacement corresponding to all the sub-window set, obtaining the M background motion displacements of the two adjacent frames of images.

In this embodiment of the present application, according to the method detailed in steps 201 to 206, the mutual information values of the two extracted images corresponding to all displacements of each group of sub-window sets in the rectangular neighborhood of displacement are calculated respectively, and the displacement corresponding to each group of sub-window sets under the maximum mutual information value is obtained respectively, so as to obtain the background motion displacement of M adjacent two frames of images, which are denoted as $(d_{x_1}, d_{y_1}), \ldots, (d_{x_m}, d_{y_m}), \ldots, (d_{x_M}, d_{y_M})$ Further, according to the M background motion displacements, the background motion displacement between two adjacent frames of images in the image sequence is determined by the potential function voting method, which includes:

selecting a radial basis function as a kernel function, and calculating the potential function value of each displacement in the M background motion displacements of the two adjacent frames of images, wherein the displacement corresponding to the maximum potential function value among the potential function values of each displacement is the background motion displacement between two adjacent frames of images.

Preferably, the calculation formula of the potential function value is:

$$P(dx_m, dy_m) = \sum_{i=1}^{M} e^{-\frac{(dx_m - dx_i)^2 + (dy_m - dy_i)^2}{2\sigma^2}}, m = 1, 2, \ldots, M,$$

wherein $(d_{x_m}, d_{y_m})$ is the displacement corresponding to the $m^{th}$ sub-window set, among a total of M sub-window sets, m=1, 2, . . . , M; $P(d_{x_m}, d_{y_m})$ is the potential function value of the displacement corresponding to the $m^{th}$ sub-window set; $dx_i$ is a displacement of the displacement corresponding to an $i^{th}$ sub-window set on the x-axis; $dy_i$ is a displacement of the displacement corresponding to the $i^{th}$ sub-window set on the y-axis; and σ is a kernel width parameter of the kernel function, σ=1.

In the embodiment of the present application, according to the M background motion displacements $(d_{x_1}, d_{y_1}), \ldots, (d_{x_m}, d_{y_m}), \ldots, (d_{x_M}, d_{y_M})$ obtained in step 207, the potential function voting method is used to determine the background motion displacement of $F_1$ relative to $F_0$ in the image sequence. A radial basis function is selected as the kernel function. Generally, Gaussian kernel function can be selected:

$$e^{-\frac{\|x\|^2}{2\sigma^2}},$$

where $\|\cdot\|^2$ is Euclidean norm operation, σ is a kernel width parameter of the kernel function, and usually σ=1 can be taken. The potential function value of each pair of displacements $(dx_m, dy_m)$ is calculated:

$$P(dx_m, dy_m) = \sum_{i=1}^{M} e^{-\frac{(dx_m - dx_i)^2 + (dy_m - dy_i)^2}{2\sigma^2}}$$

wherein $(dx_m, dy_m)$ is the displacement corresponding to the $m^{th}$ sub-window set, among a total of M sub-window set, m=1, 2, . . . , M; $P(dx_m, dy_m)$ is the potential function value of the displacement corresponding to the $m^{th}$ sub-window set; $dx_i$ is a displacement of the displacement corresponding to an $i^{th}$ sub-window set on the x-axis; $dy_i$ is a displacement of the displacement corresponding to the $i^{th}$ sub-window set on the y-axis; and σ is a kernel width parameter of the kernel function, σ=1.

The displacement corresponding to the maximum value of the potential function calculated above is the background motion displacement $(dx_{op}, dy_{op})$ of a next frame of image F1 of the infrared image sequence relative to the current frame of image $F_0$:

$$(dx_{op}, dy_{op}) = \underset{dx_m, dy_m}{\arg\max} P(dx_m, dy_m)$$

In the Formula, $(dx_{op}, dy_{op})$ is the background motion displacement of the next frame of image F1 of the infrared image sequence relative to the current frame of image $F_0$, and $$\underset{dx_m, dy_m}{\arg\max} P(dx_m, dy_m)$$

is the displacement $(dx_m, dy_m)$ corresponding to the maximum potential function $P(dx_m, dy_m)$ In the present application, the region to be matched is determined according to the maximum displacement of two adjacent frames of images in background motion, and the region to be matched is divided into a certain number of sub-regions. In these sub-regions, a certain number of sub-window sets are generated by a random method, and the background motion displacement corresponding to these sub-window sets is calculated by synchronous mutual information matching. Then the background motion displacement between two adjacent frames of images is calculated by using the potential function voting method, according to the background motion displacement corresponding to these sub-window sets. The method of the present application is based on image block matching and does not depend on the extraction of feature points, so it has high robustness to the background motion estimation of infrared image sequences with few feature points and noise interference.

Figure 6:
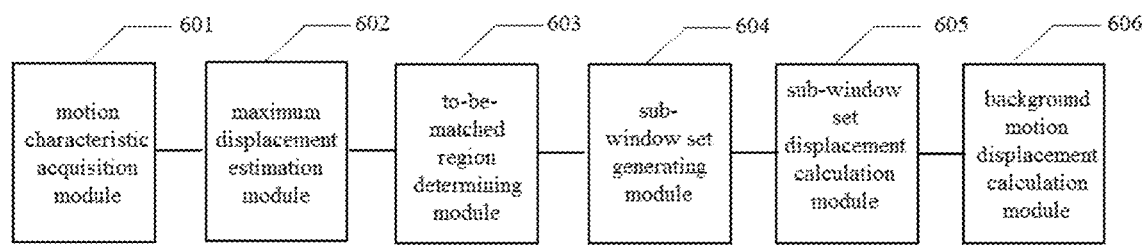
FIG. 6 is a structural schematic diagram of a device for estimating background motion for infrared image sequences provided by an embodiment of the present application.

The second aspect of the present application provides a device for estimating background motion of infrared image sequences, as shown in FIG. 6, which is a device for estimating background motion for infrared image sequences provided by an embodiment of the present application. The device comprises:

a motion characteristic acquisition module 601, configured to acquire motion characteristics of a camera in a scene where the camera is located;

a maximum displacement estimation module 602, configured to estimating a possible maximum displacement of a field of view of the camera in two adjacent frames of images of the infrared image sequences shot by the camera according to the motion characteristics;

a to-be-matched region determining module 603, configured to determine regions to be matched of the two adjacent frames of images by using the maximum displacement, wherein the regions to be matched are the regions with the same background in the two adjacent frames of images;

a sub-window set generating module 604, configured to divide the regions to be matched into T sub-regions, and randomly generating M groups of sub-window set with the same shape in the T sub-regions of the region to be matched, wherein each group of sub-window set comprises K sub-windows, where T, K and M are positive integers, and K is greater than T; and each sub-window is entirely located in a sub-region, and each sub-region comprises at least one sub-window;

a sub-window set displacement calculation module 605, configured to compute M possible background motion displacements of the two adjacent frames of images according to the M groups of sub-window set, through randomly sampling multi-window synchronous mutual information matching; and a background motion displacement calculation module 606, configured to determine the background motion displacement between the two adjacent frames of images in the image sequences by a potential function voting method according to the M background motion displacements.

In the embodiment of the present application, it can be understood that the implementation process of each module of the device in FIG. 6 is the same as each step in FIG. 1, and will not be repeated here.

According to the device for estimating background motion for infrared image sequences provided by the embodiment of the present application, a region to be matched is divided into a certain number of sub-regions, a certain number of sub-window sets are generated by a random method in these sub-regions, the background motion displacement corresponding to these sub-window sets is calculated by a synchronous mutual information matching method, and then the background motion displacement between two adjacent frames of images is calculated by a potential function voting method according to the background motion displacement corresponding to these sub-window sets. The method is based on image block matching and does not depend on the extraction of feature points, so it has high robustness to the background motion estimation of infrared image sequences with few feature points and noise interference.

A third aspect of the present application also provides a readable storage medium on which a computer program is stored, which is characterized in that when the computer program is executed, each step in FIG. 1 is executed.

In the above-mentioned embodiments, the descriptions of each embodiment have their own emphasis. For those parts that are not detailed in one embodiment, please refer to the relevant descriptions of other embodiments.

The above is a description of the technical solution provided by the present application. For those skilled in the art, there will be changes in the specific implementation and application scope according to the ideas of the embodiments of the present application. To sum up, the contents of this specification should not be construed as limitations of the present application.

The invention claimed is:

1. A method for estimating background motion of infrared image sequences, comprising:

acquiring motion characteristics of a camera in a scene where the camera is located;

estimating a possible maximum displacement of a field of view of the camera in two adjacent frames of images of the infrared image sequences shot by the camera according to the motion characteristics;

determining regions to be matched of the two adjacent frames of images by using the maximum displacement, wherein the regions to be matched are the regions with the same background in the two adjacent frames of images;

dividing the regions to be matched into T sub-regions with same shape and size, and randomly generating M groups of sub-window set with the same shape in the T sub-regions of the region to be matched, wherein each group of sub-window set comprises K sub-windows, where T, K and M are positive integers, and K is greater than T; and each sub-window is entirely located in a sub-region, and each sub-region comprises at least one sub-window;

computing M background motion displacements of the two adjacent frames of images according to the M groups of sub-window set, through randomly sampling multi-window synchronous mutual information matching; and determining the background motion displacement between the two adjacent frames of images in the image sequences by a potential function voting method according to the M background motion displacements;

wherein, randomly generating M groups of sub-window set in the T sub-regions of the region to be matched comprises:

acquiring parameters of each sub-region which comprise point coordinates of an upper left corner of the sub-region and height and width values of the sub-region, wherein the point coordinates of the upper left corner of the sub-region are determined based on a two-dimensional rectangular coordinate system established by taking an upper left corner of the region to be matched as an origin, an x-axis extending downward and a y-axis extending rightward;

acquiring the height and width values of the sub-windows in each sub-window set;

calculating the coordinates of the upper left corner of each sub-window using a random generation formula, according to the height and width value of each sub-window and parameters of a sub-region where the sub-window is located; and obtaining the M groups of sub-window set according to the coordinates of the upper left corner of each sub-window and the height and width values of the sub-windows;

wherein the random generation formula is expressed as:

$$x_{mk} = \text{Round}(x_t + \text{Uniform}(0,1)*(H_x - h_x))$$

$$y_{mk} = \text{Round}(y_t + \text{Uniform}(0,1)*(H_y - h_y))$$

wherein $x_{mk}$ is a coordinate of a $k^{th}$ sub-window in an $m^{th}$ group of sub-window set on the x-axis, and $y_{mk}$ is a coordinate of the $k^{th}$ sub-window in the $m^{th}$ group of sub-window set on the y-axis, Uniform(0,1) is a function to uniformly distribute a random number in a random generation interval [0,1], Round (.) is a rounding function, $x_t$ is a coordinate of an upper left corner of a $t^{th}$ sub-region on the x-axis, $y_t$ is a coordinate of the upper left corner of the $t^{th}$ sub-region on the y-axis, $H_x$ is a height value of the sub-region, $H_y$ is a width value of the sub-region, $h_x$ is a height value of the sub-window, and $h_y$ is a width value of the sub-window.

2. The method for estimating background motion of infrared image sequences of claim 1, wherein, the sub-region is strip or rectangle-shaped, and the sub-window is strip or rectangle-shaped.

3. A non-transitory readable storage medium, storing a computer program thereon, wherein, the computer program, performs the steps of claim 1 when executed.

4. A method for estimating background motion of infrared image sequences, comprising:
  acquiring motion characteristics of a camera in a scene where the camera is located;
  estimating a possible maximum displacement of a field of view of the camera in two adjacent frames of images of the infrared image sequences shot by the camera according to the motion characteristics;
  determining regions to be matched of the two adjacent frames of images by using the maximum displacement, wherein the regions to be matched are the regions with the same background in the two adjacent frames of images;
  dividing the regions to be matched into T sub-regions with same shape and size, and randomly generating M groups of sub-window set with the same shape in the T sub-regions of the region to be matched, wherein each group of sub-window set comprises K sub-windows, where T, K and M are positive integers, and K is greater than T; and each sub-window is entirely located in a sub-region, and each sub-region comprises at least one sub-window;
  computing M background motion displacements of the two adjacent frames of images according to the M groups of sub-window set, through randomly sampling multi-window synchronous mutual information matching; and
  determining the background motion displacement between the two adjacent frames of images in the image sequences by a potential function voting method according to the M background motion displacements;
  wherein, computing M background motion displacements of the two adjacent frames of images according to the M groups of sub-window set, through randomly sampling multi-window synchronous mutual information matching comprise the following steps:
    S1: acquiring rectangular neighborhoods of displacements of the two adjacent frames of images on the x-axis and y-axis of the established two-dimensional rectangular coordinate system;
    S2: extracting image blocks covered on a former frame of image of the two adjacent frames of images for all sub-windows in a specified sub-window set, and connecting the image blocks according to a preset order to generate a first image;
    S3: randomly taking a displacement in the rectangular neighborhoods of the displacements, and moving the specified sub-window set by the displacement to obtain a moved sub-window set;
    S4: extracting image blocks covered on a latter frame of image of the two adjacent frames of images for all sub-windows in the moved sub-window set, and connecting the extracted image blocks according to the preset order to generate a second image;
    S5: calculating mutual information of the first image and the second image;
    S6: calculating mutual information corresponding to all displacements of the specified sub-window set in the rectangular neighborhoods of displacements according to steps S2 to S5, and taking the displacement corresponding to the maximum mutual information as the background motion displacement corresponding to the specified sub-window set; and
    S7: calculating the background motion displacement corresponding to all the sub-window set according to steps S2 to S6, and obtaining the M background motion displacements of the two adjacent frames of images.

5. The method for estimating background motion of infrared image sequences of claim 4, wherein, formula for calculating the mutual information of the first image and the second image is:

$$MI(A_m, B_m(dx,dy)) = H(A_m) + H(B_m(dx,dy)) - H(A_m, B_m(dx,dy))$$

wherein $A_m$ is the first image, and $B_m(dx,dy)$ is the second image obtained after the first image $A_m$ is moved by the displacement $(dx,dy)$, $(A_m, B_m(dx,dy))$ is the mutual information of the first image and the second image, $H(.)$ is an image entropy function, and $H(.,.)$ is an image joint entropy function.

6. The method for estimating background motion of infrared image sequences of claim 4, wherein, determining the background motion displacement between the two adjacent frames of images in the image sequence by using a potential function voting method according to the M background motion displacements comprises:
  selecting a radial basis function as a kernel function, and calculating the potential function value of each displacement in the M background motion displacements of the two adjacent frames of images, wherein the displacement corresponding to the maximum potential function value among the potential function values of each displacement is the background motion displacement between two adjacent frames of images.

7. The method for estimating background motion of infrared image sequences of claim 6, wherein, the potential function value is calculated by the following formula:

$$P(dx_m, dy_m) = \sum_{i=1}^{M} e^{-\frac{(dx_m - dx_i)^2 + (dy_m - dy_i)^2}{2\sigma^2}}, m = 1, 2, \ldots, M;$$

wherein $(dx_m, dy_m)$ is the background motion displacement corresponding to the $m^{th}$ sub-window set, among a total of M sub-window set, m=1, 2, . . . , M; $P(dx_m, dy_m)$ is the potential function value of the displacement corresponding to the $m^{th}$ sub-window set; $dx_i$ is a displacement of the displacement corresponding to an $i^{th}$ sub-window set on the x-axis; $dy_i$ is a displacement of the displacement corresponding to the $i^{th}$ sub-window set on the y-axis; and σ is a kernel width parameter of the kernel function, σ=1.

8. A device for estimating background motion for infrared image sequences, comprising:
  a motion characteristic acquisition module, configured to acquire motion characteristics of a camera in a scene where the camera is located;
  a maximum displacement estimation module, configured to estimating a possible maximum displacement of a field of view of the camera in two adjacent frames of images of the infrared image sequences shot by the camera according to the motion characteristics;
  a to-be-matched region determining module, configured to determine regions to be matched of the two adjacent frames of images by using the maximum displacement, wherein the regions to be matched are the regions with the same background in the two adjacent frames of images;
  a sub-window set generating module, configured to divide the regions to be matched into T sub-regions, and randomly generating M groups of sub-window set with same shape in the T sub-regions of the region to be matched, wherein each group of sub-window set comprises K sub-windows, where T, K and M are positive integers, and K is greater than T; and each sub-window is entirely located in a sub-region, and each sub-region comprises at least one sub-window;

a sub-window set displacement calculation module, configured to compute M possible background motion displacements of the two adjacent frames of images according to the M groups of sub-window set, through randomly sampling multi-window synchronous mutual information matching; and a background motion displacement calculation module, configured to determine the background motion displacement between the two adjacent frames of images in the image sequences by a potential function voting method according to the M background motion displacements;

wherein, the sub-window set generating module, randomly generating M groups of sub-window set in the T sub-regions of the region to be matched comprises:

a sub-region parameter acquiring sub-module, configured to acquire parameters of each sub-region which comprise point coordinates of an upper left corner of the sub-region and height and width values of the sub-region, wherein the point coordinates of the upper left corner of the sub-region are determined based on a two-dimensional rectangular coordinate system established by taking an upper left corner of the region to be matched as an origin, an x-axis extending downward and a y-axis extending rightward;

a sub-window parameter acquiring sub-module, configured to acquire the height and width values of the sub-windows in each sub-window set;

a sub-window coordinate acquiring sub-module, configured to calculate the coordinates of the upper left corner of each sub-window using a random generation formula, according to the height and width value of each sub-window and parameters of a sub-region where the sub-window is located; and a sub-window set acquiring sub-module, configured to obtain the M groups of sub-window set according to the coordinates of the upper left corner of each sub-window and the height and width values of the sub-windows;

wherein, the random generation formula is expressed as:

$$x_{mk} = \text{Round}(x_t + \text{Uniform}(0,1) * (H_x - h_x))$$

$$y_{mk} = \text{Round}(y_t + \text{Uniform}(0,1) * (H_y - h_y))$$

wherein $x_{mk}$ is a coordinate of a $k^{th}$ sub-window in an $m^{th}$ group of sub-window set on the x-axis, and $y_{mk}$ is a coordinate of the $k^{th}$ sub-window in the $m^{th}$ group of sub-window set on the y-axis, Uniform(0,1) is a function to uniformly distribute a random number in a random generation interval [0,1], Round (.) is a rounding function, $x_t$ is a coordinate of an upper left corner of a $t^{th}$ sub-region on the x-axis, $y_t$ is a coordinate of the upper left corner of the $t^{th}$ sub-region on the y-axis, $H_x$ is a height value of the sub-region, $H_y$ is a width value of the sub-region, $h_x$ is a height value of the sub-window, and $h_y$ is a width value of the sub-window.

* * * * *